US 6,233,647 B1

(12) United States Patent
Bentz et al.

(10) Patent No.: US 6,233,647 B1
(45) Date of Patent: May 15, 2001

(54) HASHED DIRECT-MAPPED TEXTURE CACHE

(75) Inventors: Ole Bentz, Sunnyvale; Carroll Philip Gossett, Mountain View; Mark Goudy, Berkely, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/111,346

(22) Filed: Jul. 7, 1998

(51) Int. Cl.[7] .................................................. G06F 12/10
(52) U.S. Cl. ................................ 711/3; 711/216; 345/516
(58) Field of Search ............................... 711/3, 118, 211, 711/216; 345/430, 515–517, 507, 508, 509, 511, 513, 425

(56) References Cited

U.S. PATENT DOCUMENTS

| | | | |
|---|---|---|---|
| 5,530,958 | * | 6/1996 | Agarwal et al. .......................... 711/3 |
| 5,649,143 | * | 7/1997 | Parady ................................... 711/220 |
| 5,844,576 | * | 12/1998 | Wilde et al. ........................... 345/525 |
| 5,945,997 | * | 8/1999 | Zhao et al. ............................ 345/430 |
| 5,987,567 | * | 11/1999 | Rivard et al. ......................... 711/118 |
| 6,000,019 | * | 12/1999 | Dykstal et al. ....................... 711/157 |
| 6,002,410 | * | 12/1999 | Battle ................................... 345/513 |

* cited by examiner

Primary Examiner—Do Yoo
Assistant Examiner—Gary J. Portka
(74) Attorney, Agent, or Firm—Wagner, Murabito & Hao LLP

(57) ABSTRACT

The present invention pertains to an apparatus for and method of mapping texture memory to a texture cache such that cache contention is minimized. Significantly, in one embodiment of the present invention, addresses of the texture memory are mapped to entries of the texture cache according to a predetermined hashing scheme. According to the one embodiment, texture memory is addressed as a virtually contiguous address space by a multi-dimensional index. The multi-dimensional index is further partitioned into a low order bit field and a high order bit field. Low order bits of the multi-dimensional index are directly mapped to low order bits of the cache address. High order bits of the multi-dimensional index are mapped to high order bits of the cache address according to a predetermined address-hashing scheme. Particularly, in one embodiment, high order bits of the multi-dimensional index are selectively "exclusive-or-ed" to generate corresponding addresses of the texture cache.

17 Claims, 6 Drawing Sheets

HASHED DIRECT-MAPPED TEXTURE CACHE

FIELD OF THE INVENTION

The present invention pertains to the field of computer controlled graphics display systems. More particularly, the present invention relates to an apparatus for and method of caching texture memory.

BACKGROUND OF THE INVENTION

Computer graphics is used in a wide variety of applications, such as in business, science, animation, simulation, computer-aided design, process control, electronic publishing, gaming, medical diagnosis, etc. In those applications, three-dimensional (3D) graphical objects are displayed on a computer screen by using a number of polygons to represent the three-dimensional objects. In order to portray a more realistic real-world representation, texture mapping is usually applied. Texture mapping refers to techniques for using two-dimensional (2D) texture images, or texture maps, for adding surface details to areas or surfaces of these 3D graphical objects. For example, given a featureless solid cube and a texture map defining a wood grain pattern, texture mapping techniques may be used to map the wood grain pattern onto the cube. The resulting image is that of a cube that appears to be made of wood. In another example, vegetation and trees can be added by texture mapping to an otherwise barren terra model in order to portray a landscape filled with vegetation and trees.

In computer systems having dedicated graphics hardware, images for use in texture mapping are typically stored in memory in the form of a collection of tiles. These tiles are addressed and managed as a virtually contiguous region of address space by a two-dimensional index (S,T). In other words, this memory management scheme treats a texture map as an array of small, contiguous tiles each including a number of texels. Thereby, memory management issues, such as caching, virtual-to-physical mapping, swapping, etc. are more easily executed.

In order to utilize computer resources more efficiently, computer graphics systems typically include a graphics co-processor for offloading processing burdens from the CPU of the computer system, and a texture memory for storing the texture data. Moreover, in order to further accelerate the texture mapping process, a special cache memory, also known as a texture cache, may also be implemented in the computer graphics systems for providing faster access to and temporary storage of frequently used tiles of texture data.

Texture caches, like other types of cache memories, are much smaller in capacity than the texture memory to which they are mapped. To this end, texture caches may be mapped to the local memory according to one of a plurality of mapping schemes. FIG. 1 illustrates, as an example, a prior art direct-mapping scheme for mapping texture memory to texture cache. As shown in FIG. 1, texture map 50 consists of texture data tiles 0 to 3 in the first row, texture data tiles 4–7 in the second row, texture data tiles 8–11 in the third row, and texture data tiles 12–15 in the fourth row. On the other hand, texture cache 20 is made up of cache lines 0–3 in the first row and cache lines 4–7 in the second row. In this mapping scheme, texture data tiles within the same column are mapped to the same cache lines in the texture cache. For instance, as illustrated in FIG. 1, texture tiles 0 and 8 are mapped to cache line 0, texture tiles 4 and 12 are mapped to cache line 4, and texture tiles 7 and 15 are mapped to cache line 7, etc.

Prior art direct-mapping schemes, such as the one illustrated in FIG. 1, have the advantage of simplicity. However, the prior art direct-mapping schemes have the disadvantage that only a single texture data tile from a given group can be present in the texture cache at a given time. That is, if two texture data tiles from the same group are frequently referenced, thrashing—repeated moving of the two tiles in and out of the cache—will occur. Unfortunately, in texture mapping, texture data tiles are commonly accessed one row or one column at a time for display or processing. For example, it is not uncommon for a particular column of the texture map 50 to be referenced frequently. In that situation, thrashing may occur, drastically reducing the usefulness and speed of the texture cache 20. Therefore, prior art direct-mapping schemes are not ideal for the purposes of caching texture maps.

In order to provide for a more flexible caching method, other cache-mapping schemes, such as fully associative mapping, and set-associative mapping, may be used. However, those cache-mapping schemes are complicated, and implementations of such schemes require a large number of gates. Naturally, these extra gates unnecessarily increase manufacturing costs of the integrated circuits and consume large amounts of valuable die area. Therefore, what is needed is a caching scheme that has the advantage of simplicity, and yet, has the flexibility to accommodate portions of texture maps that have a wide aspect ratio such that thrashing is reduced.

SUMMARY OF THE PRESENT DISCLOSURE

The present invention pertains to an apparatus for and method of mapping texture memory to a texture cache such that cache contention is minimized. Significantly, in one embodiment of the present invention, addresses of the texture memory are mapped to entries of the texture cache according to a predetermined hashing scheme.

In furtherance of one embodiment of the present invention, texture memory is addressed as a virtually contiguous address space by a two-dimensional index (S, T), wherein S and T each includes n bits for forming an array of $2^{n-k} \times 2^{m-l}$ tiles of $2^k \times 2^l$ texels. According to this embodiment, each of S and T is further partitioned into a low order bit field and a high order bit field. In this embodiment, low order bits of each of S and T are directly mapped to storage locations of the texture cache. High order bits of S and T are mapped to entries of the texture cache according to a predetermined scheme. Particularly, high order bits of S and T are selectively "exclusive-or-ed" to generate corresponding addresses of the texture cache.

In another embodiment of the present invention, texture data are stored in a plurality of texture maps corresponding to different level of details. In that embodiment, each texture map includes an LOD index corresponding to a specific level of details of the texture map. In that embodiment, low order bits of S and T are directly mapped to the texture cache, while high order bits of S and T, and a plurality of bits of LOD are selectively "exclusive-or-ed" to generate corresponding addresses in the texture cache. In yet another embodiment of the present invention, texture data are addressed by a three-dimensional index (R, S, T). In that embodiment, high order bits of R, S and T are selectively "exclusive-or-ed" to generate addresses of the texture cache, while low order bits of R, S, and T are directly mapped to the texture cache. The texture cache according to one embodiment of the present invention may also include a mode selection input for selecting one of a plurality of operation modes in which different texture map addressing schemes and different mapping schemes are used.

BRIEF DESCRIPTION OF THE DRAWINGS

The accompanying drawings, which are incorporated in and form a part of this specification, illustrate embodiments of the present invention and, together with the description, serve to explain the principles of the invention.

Prior art

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "composing", "storing", or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

Computer System Environment of the Present Invention

Figure 1:
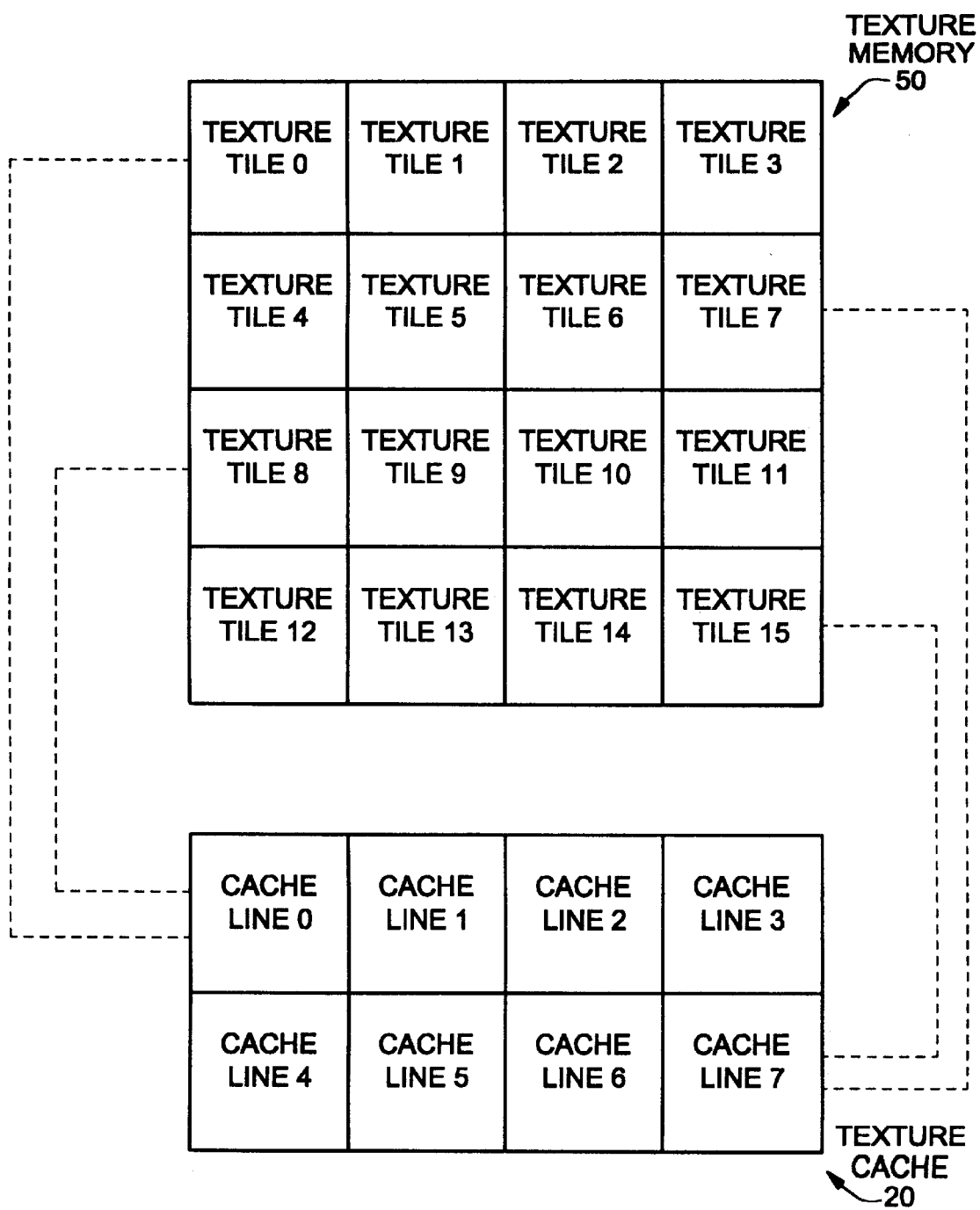
FIG. 1 illustrates an exemplary direct-mapping scheme for mapping texture memory to a texture cache.
Figure 2:
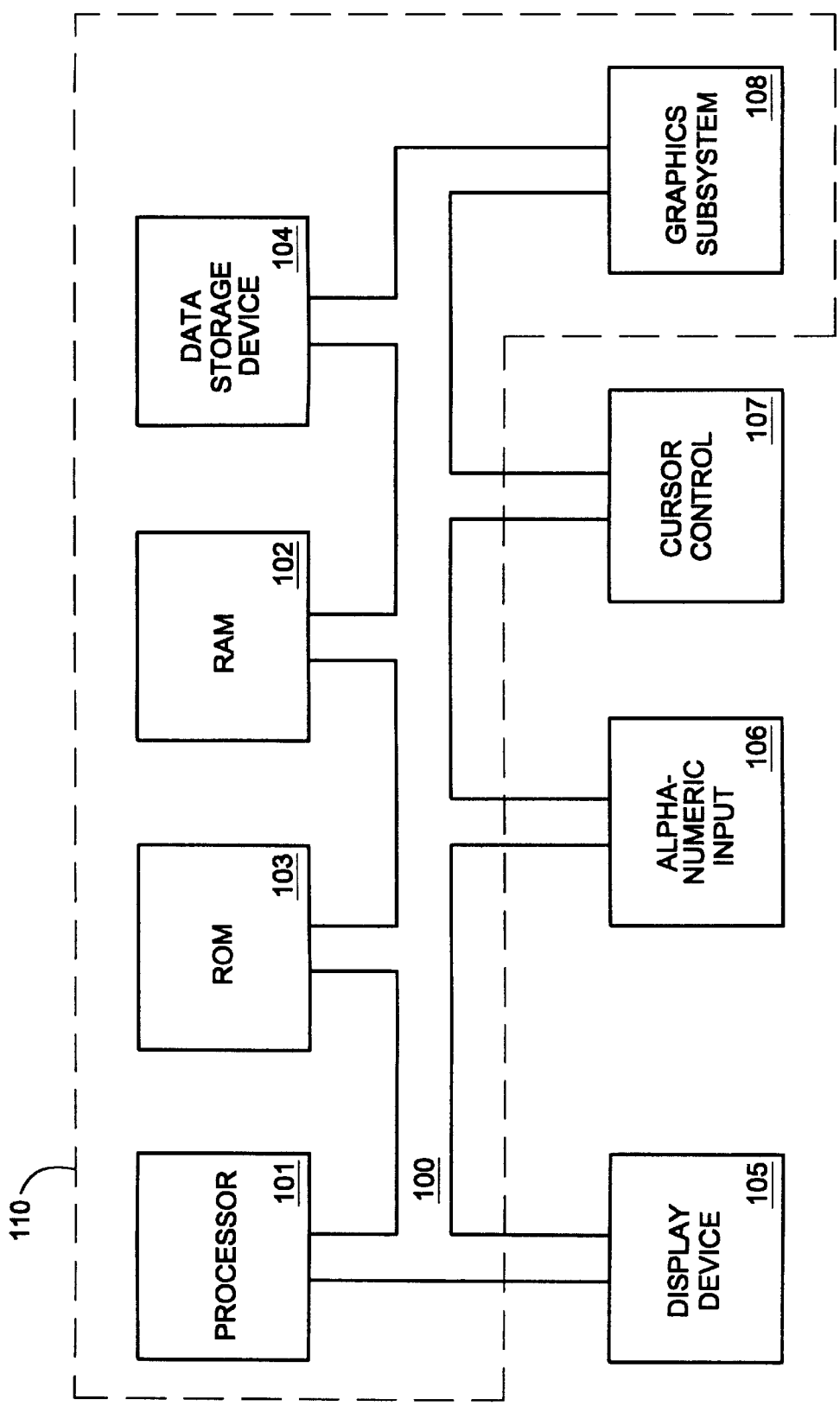
FIG. 2 illustrates an exemplary computer system used as part of a computer graphics system in accordance with one embodiment of the present invention.

With reference to FIG. 2, portions of the present invention are comprised of computer-readable and computer executable instructions which reside, for example, in computer-usable media of a computer system. FIG. 2 illustrates an exemplary computer system 110 used as a part of a computer graphics system in accordance with one embodiment of the present invention. It is appreciated that system 110 of FIG. 2 is exemplary only and that the present invention can operate within a number of different computer systems including general purpose computer systems, embedded computer systems, and stand alone computer systems specially adapted for generating and displaying graphics images.

System 110 of FIG. 2 includes an address/data bus 100 for communicating information, and a central processor unit 101 coupled to bus 100 for processing information and instructions. System 110 also includes data storage features such as computer-usable volatile memory 102, e.g. random access memory (RAM), coupled to bus 100 for storing information and instructions for central processor unit 101, computer-usable non-volatile memory 103, e.g. read only memory (ROM), coupled to bus 100 for storing static information and instructions for the central processor unit 101, and a data storage device 104 (e.g., a magnetic or optical disk and disk drive) coupled to bus 100 for storing information and instructions. A graphics subsystem 108, which may include a graphics co-processor for offloading computation burden from central processing unit 101 and embedded DRAM for increased memory bandwidth, coupled to bus 100, is also included in system 110 of FIG. 2. System 110 of the present invention also includes an optional alphanumeric input device 106 including alphanumeric and function keys coupled to bus 100 for communicating information and command selections to central processor unit 101. System 110 also optionally includes a cursor control device 107 coupled to bus 100 for communicating user input information and command selections to central processor unit 101, and an optional display device 105 coupled to bus 100 for displaying information.

Display device 105 of FIG. 2, utilized with the present invention, may be a liquid crystal display device, cathode ray tube, or other display devices suitable for displaying graphics images and alphanumeric characters recognizable to a user. Optional cursor control device 107 allows the computer user to signal dynamically the two-dimensional movement of a visible symbol (cursor) on a display screen of display device 105. Many implementations of cursor control device 107 are known in the art including a trackball, mouse, touch pad, joystick, or special keys on alphanumeric input device 106 capable of signaling movement of a given direction or manner of displacement. Alternatively, it will be appreciated that a cursor can be directed and/or activated via input from alphanumeric input device 106 using special keys and key sequence commands. The present invention is also well suited to directing a cursor by other means such as, for example, voice commands.

General Description of the Present Embodiments

The present invention is a novel and unique solution to the aforementioned shortcomings of prior art cache mapping schemes. Particularly, the present invention pertains to an apparatus for and method of mapping texture memory to a texture cache of a computer graphics system, such as exemplary computer system 110 of FIG. 2, according to a predetermined hashing scheme. In furtherance of one embodiment of the present invention, texture data (e.g.

texture maps) are stored in a tiled format within computer system 110. For instance, a two-dimensional texture map may be partitioned into an array of m×m tiles, each containing a plurality of texels addressed by a two-dimensional index (S, T). Further, for simplicity, it is assumed that computer system 110 includes a dedicated texture memory specially configured for handling tiled data sets. Methods and apparatus for storing and addressing texture maps with multi-dimensional indices, such as (S,T) and (R,S,T), are well known in the art. Therefore, implementation details of the texture memory are not discussed herein in order to avoid obscuring aspects of the present invention. It should also be apparent to those of ordinary skill in the art that the present invention may also be applied for purposes other than texture mapping, and that the present invention may be used for caching any types of computer data.

Hashing Schemes of the Present Invention

According to one embodiment of the present invention, texture memory is directly mapped to texture cache according to a predetermined hashing scheme such that cache contention is minimized. In one embodiment of the present invention, texture memory is addressed as a virtually contiguous address space by a two-dimensional index (S, T), wherein S and T each includes n bits for forming an array of $2^{n-k} \times 2^{n-k}$ tiles of $2^k \times 2^k$ texels. In this embodiment, each of S and T is partitioned into a low order bit field and a high order bit field. Low order bits of each of S and T are directly mapped to low order bits of the addresses of the texture cache. High order bits of S and T are selectively hashed. Particularly, high order bits of S and T are selectively "exclusive-or-ed" to generate corresponding addresses of the texture cache. Table 1 illustrates one exemplary relationship between the two-dimensional index (S, T), and the addresses (ADR) of the texture cache according to one embodiment of the present invention. It should be noted that the texture cache, in this embodiment, is also configured for storing tiles of $2^k \times 2^k$ texels.

TABLE 1

| | Cache Address | | | | |
|---|---|---|---|---|---|
| | ADR[8] | ADR[7] | ADR[6] | ADR[5] | ADR[4] |
| Mapping Function | S[5] XOR T[6] | S[6] XOR T[5] | S[7] XOR T[7] | T[4] | S[4] |

As shown in Table 1, high order bits of ADR (e.g. ADR[8] to ADR[4]), are mapped to high order bits of S and T according to a mapping function. Particularly, ADR[8] is mapped to S[5] XOR T[6], ADR[7] is mapped to S[6] XOR T[5], ADR[6] is mapped to S[7] XOR T[7], ADR[5] is mapped to T[4]; and ADR[4] is mapped to S[4]. In the present embodiment, low order bits of ADR (e.g. bit 0 to bit 3) are directly mapped to low order bits of S and T (e.g. S[0] to S[3] and T[0] to T[3]). It should be apparent to those of ordinary skill in the art, upon reading the present disclosure, that S and T may comprise any number of bits. Further, any higher order bits than those used in the hashing scheme may be used to compose a tag for uniquely identifying the texture tiles that are cached. Details of the tag and the tag memory according to the present invention will be discussed in the following section.

A partial truth table according to such a mapping function is illustrated below in Table 2.

TABLE 2

| | | CACHE ADDRESS | | | | |
|---|---|---|---|---|---|---|
| S[7...4] | T[7...4] | ADR[8] S[5]^T[6] | ADR[7] S[6]^T[5] | ADR[6] S[7]^T[7] | ADR[5] T[4] | ADR[4] S[4] |
| 0000 | 0000 | 0 | 0 | 0 | 0 | 0 |
| 0000 | 0001 | 0 | 0 | 0 | 1 | 0 |
| 0000 | 0010 | 0 | 1 | 0 | 0 | 0 |
| 0000 | 0011 | 0 | 1 | 0 | 1 | 0 |
| 0000 | 0100 | 1 | 0 | 0 | 0 | 0 |
| 0000 | 0101 | 1 | 0 | 0 | 1 | 0 |
| 0000 | 0110 | 1 | 1 | 0 | 0 | 0 |
| 0000 | 0111 | 1 | 1 | 0 | 1 | 0 |
| 0000 | 1000 | 0 | 0 | 1 | 0 | 0 |
| 0000 | 1001 | 0 | 0 | 1 | 1 | 0 |
| 0000 | 1010 | 0 | 1 | 1 | 0 | 0 |
| 0000 | 1011 | 0 | 1 | 1 | 1 | 0 |
| 0000 | 1100 | 1 | 0 | 1 | 0 | 0 |
| 0000 | 1101 | 1 | 0 | 1 | 1 | 0 |
| 0000 | 1110 | 1 | 1 | 1 | 0 | 0 |
| 0000 | 1111 | 1 | 1 | 1 | 1 | 0 |
| 0000 | 0010 | 0 | 1 | 0 | 0 | 0 |
| 0001 | 0010 | 0 | 1 | 0 | 0 | 1 |
| 0010 | 0010 | 1 | 1 | 0 | 0 | 0 |
| 0011 | 0010 | 1 | 1 | 0 | 0 | 1 |
| 0100 | 0010 | 0 | 0 | 0 | 0 | 0 |
| 0101 | 0010 | 0 | 0 | 0 | 0 | 1 |
| 0110 | 0010 | 1 | 0 | 0 | 0 | 0 |
| 0111 | 0010 | 1 | 0 | 0 | 0 | 1 |
| 1000 | 0010 | 0 | 1 | 1 | 0 | 0 |
| 1001 | 0010 | 0 | 1 | 1 | 0 | 0 |
| 1010 | 0010 | 1 | 1 | 1 | 0 | 0 |
| 1011 | 0010 | 1 | 1 | 1 | 0 | 1 |
| 1100 | 0010 | 0 | 0 | 1 | 0 | 0 |
| 1101 | 0010 | 0 | 0 | 1 | 0 | 1 |
| 1110 | 0010 | 1 | 0 | 1 | 0 | 0 |
| 1111 | 0010 | 1 | 0 | 1 | 0 | 1 |

Table 2 illustrates a partial truth table of the mapping function of Table 1. Particularly, Table 2 contains the truth table of the mapping function when S remains at 0000, corresponding to a patch of tiles spanning in the T direction in the texture memory. In addition, Table 2 contains the truth table of the mapping function when T remains at 0010, corresponding to a patch of tiles spanning in the S direction.

Figure 3A:
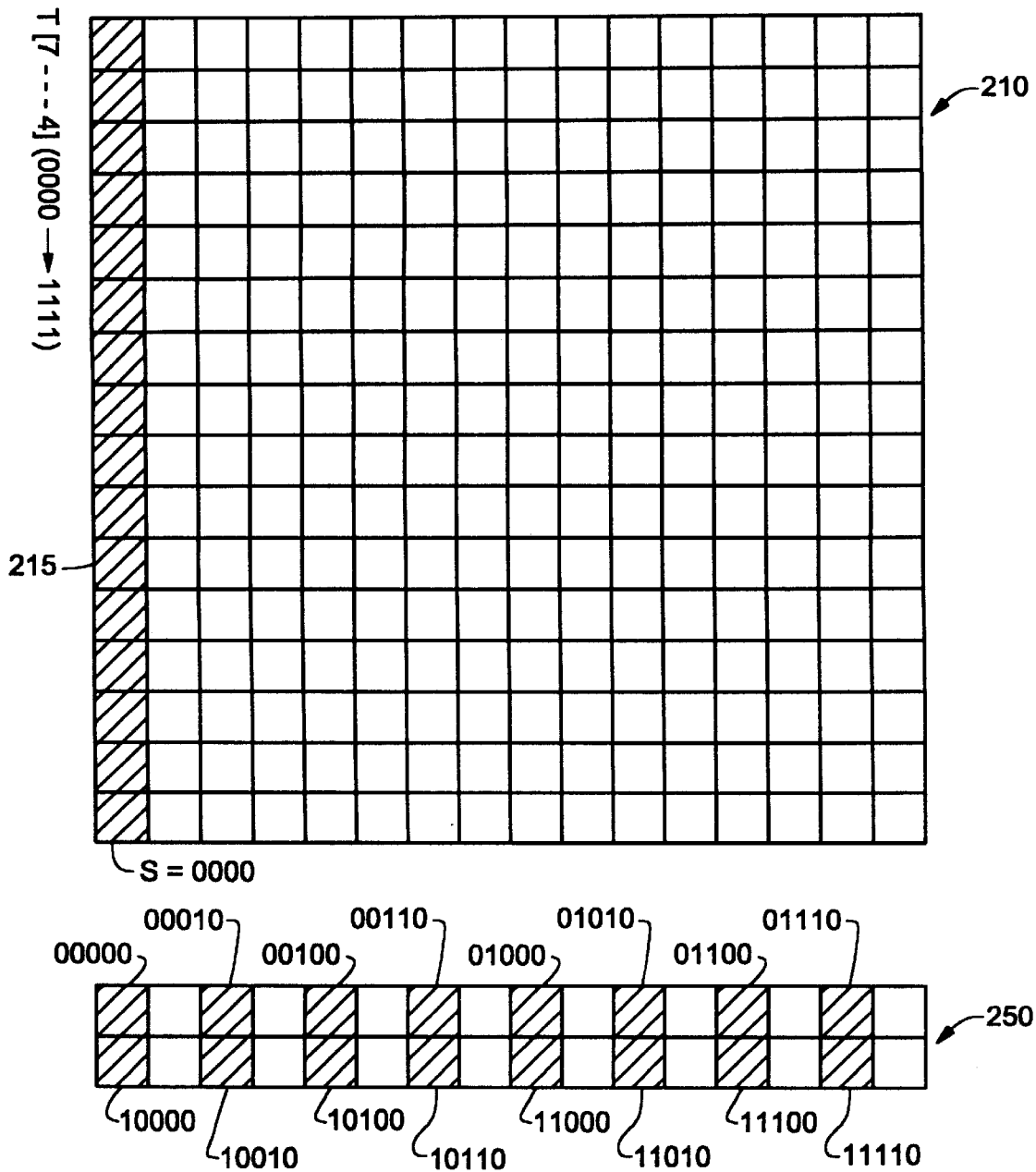
FIG. 3A illustrates an exemplary hashed mapping scheme for mapping texture memory to a texture cache according to one embodiment of the present invention. Particularly, the mapping of an entire row of texel tiles is shown.
Figure 3B:
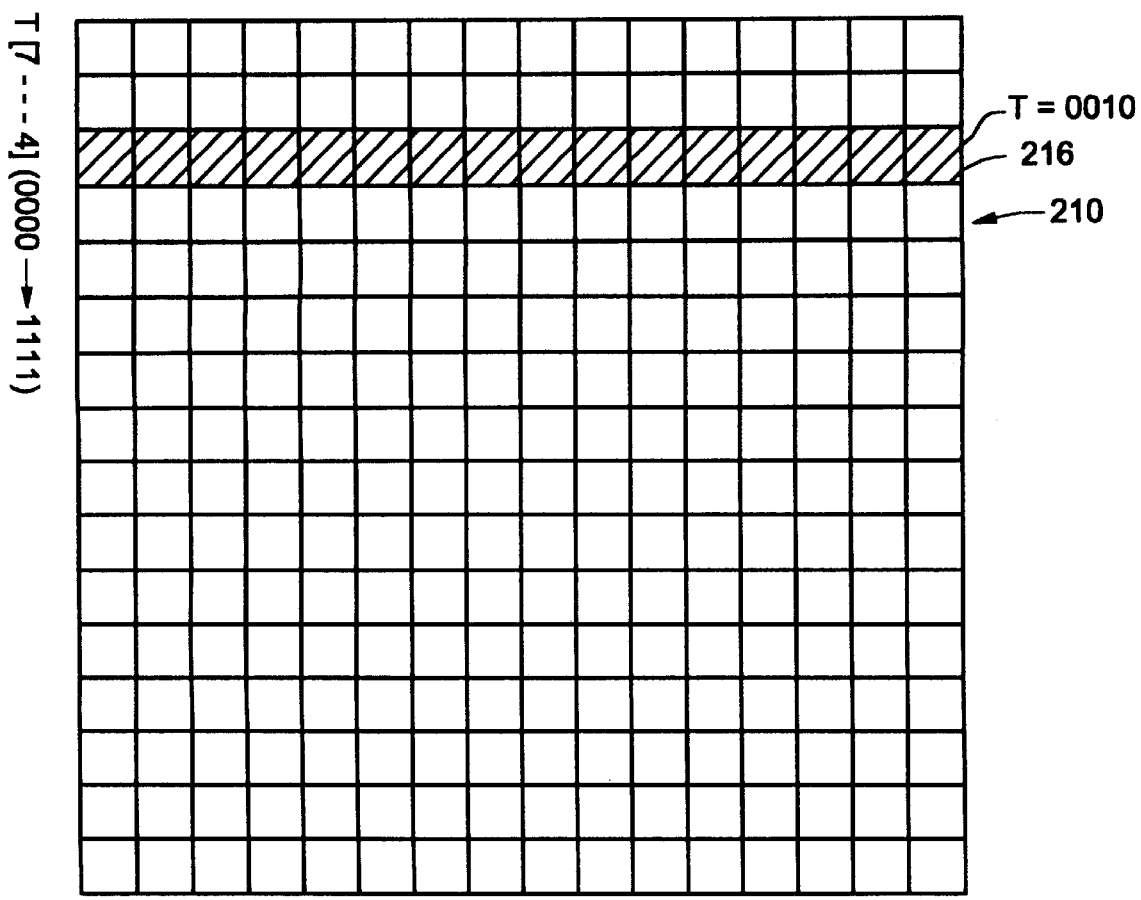
FIG. 3B illustrates the exemplary hashed mapping scheme in FIG. 3A according to one embodiment of the present invention. Particularly, the mapping of an entire column of texel tiles is shown.
Figure 3B:
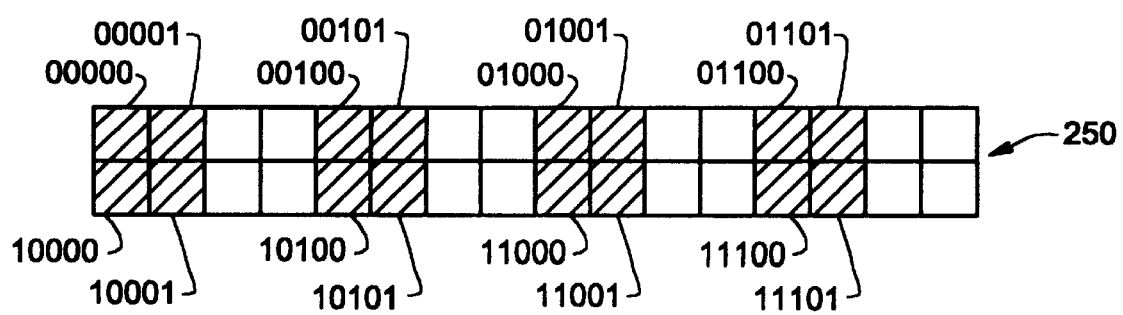

FIG. 3A and FIG. 3B illustrate an exemplary mapping scheme according to the present embodiment. As illustrated in FIG. 3A, texture map 210 comprises an array of 16×16 texel tiles addressed as a contiguous two-dimensional address space by a two-dimensional index (S, T). S and T each comprises 8 bits—4 lower order bits for directly mapping to texels within each texel tile, and 4 higher order bits for pointing to one of the 16×16 texel tiles. Further, a first patch of tiles 215 of texture map 210 corresponds to the partial truth table of Table 2 where S[7 . . . 4] is 0000. As illustrated, according to Table 2, first patch of tiles 215 are mapped to various different entries of texture cache 250. Namely, first patch of tiles 215 are mapped to cache addresses 00000, 00010, 00100, 00110, 01000, 01010, 01100, 01110, 10000, 10010, 10100, 10110, 11000, 11010, 11100, and 11110 of texture cache 250.

In FIG. 3B, a second patch of tiles 216 of texture map 210 corresponds to the part of Table 2 where T remains constant at 0010. As illustrated, second patch of tiles 216 are mapped to various different entries of texture cache 250. Namely, second patch 216 are mapped to cache addresses 00000, 00001, 00100, 00101, 01000, 01001, 01100, 01101, 10000, 10001, 10100, 10101, 11001, 11100, and 11101 of texture cache 250. In this way, the mapping scheme according to the present embodiment allows most tiles of a patch of the texture map 210 (e.g. first patchwork 215 and second patchwork 216) to be stored in texture cache 250 simultaneously regardless of the orientation and the aspect ratio of the patch. As a result, cache contention is minimized.

In another embodiment of the present invention, texture data are stored in a plurality of texture maps corresponding to different levels of details. In that embodiment, each texture map includes an LOD index corresponding to a specific level of details of the texture map. In that embodiment, low order bits of S and T are directly mapped to the texture cache, while high order bits of S and T, and a plurality of bits of LOD are selectively "exclusive-or-ed" to generate corresponding addresses in the texture cache. An exemplary mapping function according to this embodiment of the invention is illustrated in Table 3.

TABLE 3

| | Cache Address | | | | |
|---|---|---|---|---|---|
| | ADR[8] | ADR[7] | ADR[6] | ADR[5] | ADR[4] |
| Mapping Function | (LOD sign ? LOD[0]: LOD[2]) XOR S[5] XOR T[6] | LOD[1] XOR S[6] XOR T[5] | LOD[0]∥ LOD sign | T[4] | S[4] |

In Table 3, the mapping function includes logic operations other than XORs. For instance, in Table 3, ADR[8] is mapped to (LOD sign ? LOD [0]:LOD [2]) XOR S[5] XOR T[6], and ADR[6] is mapped to LOD[0]∥LOD sign. These logic operations are well known. Therefore, methods and apparatus for implementing these logic operations in hardware or software would be apparent to those ordinarily skilled in the art upon reading the present disclosure.

In yet another embodiment of the present invention, texture data are addressed by a three-dimensional index (R, S, T). In that embodiment, high order bits of R, S and T are "exclusive-or-ed" to generate addresses of the texture cache, while low order bits of R, S, and T are directly mapped to the texture cache. An exemplary mapping function according to this embodiment of the present invention is illustrated below in Table 4.

TABLE 4

| | Cache Entry | | | | |
|---|---|---|---|---|---|
| | ADR[8] | ADR[7] | ADR[6] | ADR[5] | ADR[4] |
| Mapping Function | R[2] XOR S[5] XOR T[6] | R[1] XOR S[6] XOR T[5] | R[0] | T[4] | S[4] |

According to one embodiment of the present invention, the texture cache may have a plurality of different operation modes. For instance, for some applications, it would be desirable to store multiple texture maps or images in the texture memory. In that case, it would be advantageous to split the texture memory and the texture cache into multiple sections, each storing texture data particular to one of the multiple texture maps or images. In order to configure the texture cache for such "split mode" operations, multiple mapping schemes are implemented within the texture cache. In that embodiment, a PHASE index may be used to map the texture memory selectively to the texture cache.

Different operation modes may require different hashing schemes for optimal performance. To this end, the texture cache according to one embodiment of the present invention may also include a mode selection input for selecting one of a plurality of operation modes in which different texture map addressing schemes and different mapping schemes are used. These operation modes may specify the dimensions of the texture images (1D, 2D, or 3D), the availability of level-of-details (Imaging), unified or split cache configurations, etc. It should be noted that these different operation modes are well known in the art and are, therefore, not described herein in order to avoid obscuring aspects of the present invention. Table 5 summarizes the various mapping functions of a texture cache having a plurality of operational modes according to the present embodiment.

TABLE 5

| Dimen Imag. Cache LOD | | | 2D | | | 3D | |
|---|---|---|---|---|---|---|---|
| | Yes | | No | | | No | |
| | Unif. | Split | Unified | | Split | Unif. | Split |
| | — | — | Yes | No | — | — | — |
| ADR[8] | S[5] XOR T[6] | (LOD sign ? LOD[0]: LOD[2]) XOR S[5] XOR T[6] | LOD[2] XOR S[5] XOR T[6] | Phase | R[2] XOR S[5] XOR T[6] | Phase |
| ADR[7] | S[6] XOR T[5] | LOD[1] XOR S[6] XOR T[5] | LOD[1] XOR S[6] | LOD[1] XOR S[5] XOR T[5] | R[1] XOR S[6] XOR T[5] | R[1] XOR S[5] XOR T[5] |
| ADR[6] | S[7] XOR T[7] | Phase | LOD[0]∥ LOD sign | LOD[0] | R[0] |
| ADR[5] | | | T[4] | | | | |
| ADR[4] | | | S[4] | | | | |

Cache-Read and Cache-Write Operations

Figure 4A:
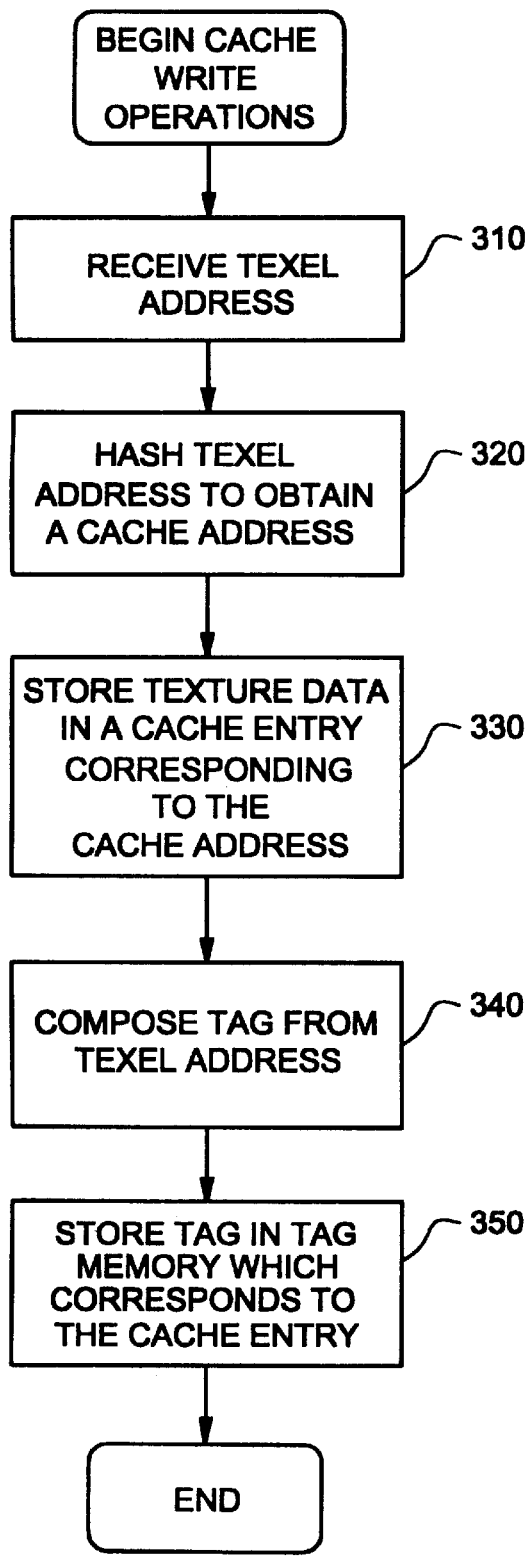
FIG. 4A is a flow diagram illustrating a cache-write operation in furtherance of one embodiment of the present invention.

FIG. 4A illustrates the cache-write operations in which texture data are written to the texture cache according to one embodiment of the present invention. As illustrated in FIG. 4A, at step 310, a texel address (e.g. two-dimensional index S, T) is received by the texture cache of the present invention. As discussed above, a texel address may comprise a multi-dimensional index, and each dimension of the index may include a plurality of bits. Further, according to the present invention, low order bits (e.g. least significant 4 bits) may be used to address individual texels within a texel tile, and high order bits may used to address individual texel tiles.

At step 320, higher order bits of the texel address are hashed according to a predetermined mapping function to generate a cache address. The predetermined mapping function applied may be one of the plurality of mapping functions discussed above. Furthermore, it should be apparent to those ordinarily skilled in the art, upon reading the present disclosure, that other mapping functions may be applied to hash the texel address into the cache address.

At step 330, texture data (e.g. texels) are stored in the texture cache at the cache address generated at step 320. According to one embodiment of the present invention, texture data are moved from the texture memory at the texel address to the texture cache. Furthermore, the texture data are preferably transferred one texel tile at a time. One method of transferring texel tiles from texture memory to a texture cache can be found in U.S. Pat. No. 5,706,481, by Hannah et al., and assigned to the present assignee. A more efficient method and apparatus for transferring texel tiles can also be found in U.S. patent application Ser. No. 09/048,099, entitled "METHOD FOR EFFICIENT HANDLING OF TEXTURE CACHE MISSES BY RECIRCULATION," which is hereby incorporated by reference.

At step 340, a tag is composed from the texture address. According to one embodiment of the present invention, a tag may include higher order bits of the texel address. It should be apparent to those of ordinary skill in the art that the tag may include any number of bits of the texel address as long as the tag thus composed can uniquely identify the contents of the texture cache.

At step 350, the tag composed at step 340 is stored in a tag memory in association with the cache address generated at step 320. In one embodiment of the present invention, each entry of the texture cache corresponds to an entry in the tag memory. For instance, the texture cache may include a total of 4K entries, and the tag memory also includes 4K entries each pointing to one of the entries of the texture cache. In this way, contents of each entry of the texture cache may be uniquely identified by the corresponding tag.

Figure 4B:
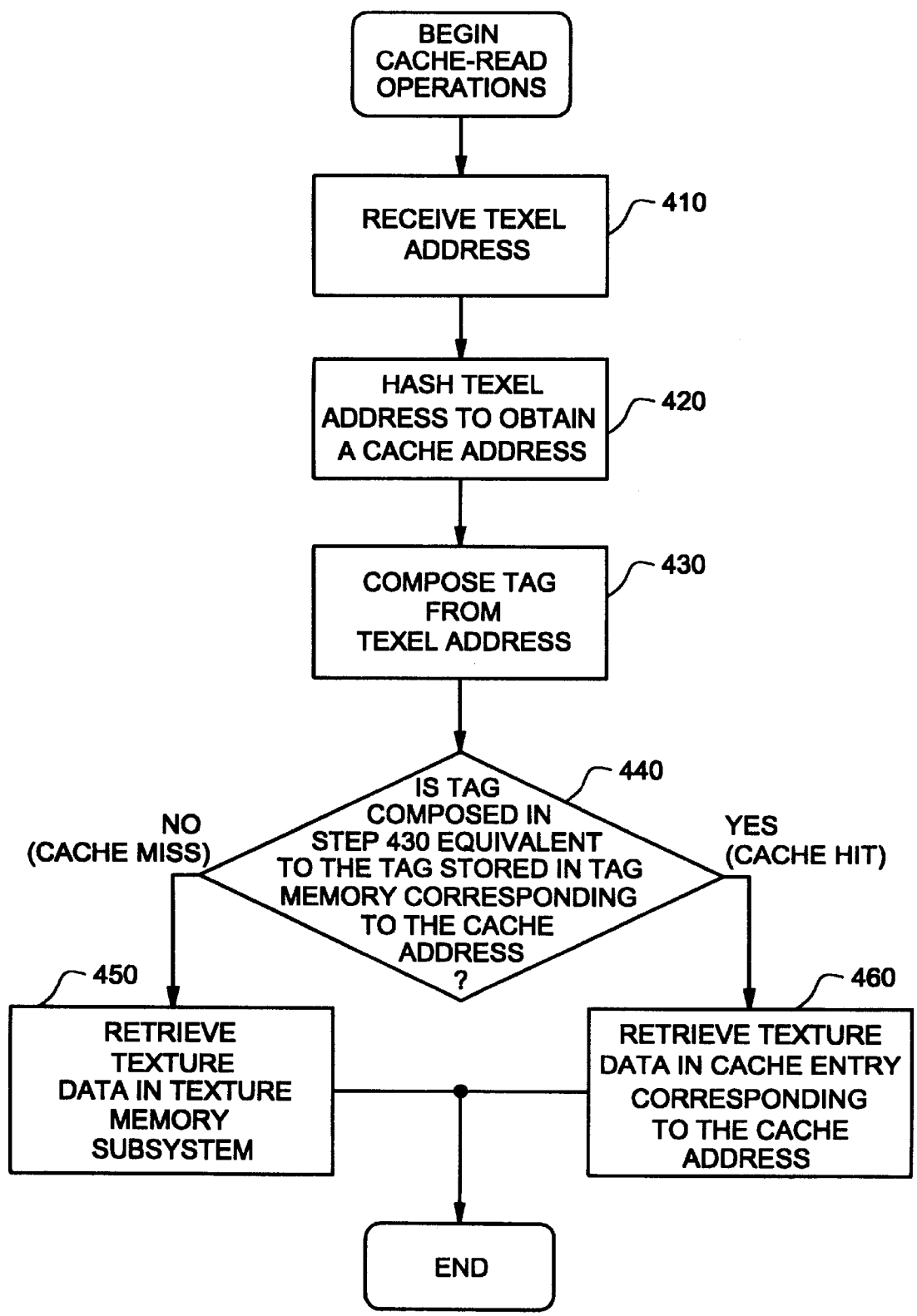
FIG. 4B is a flow diagram illustrating a cache-read operation in furtherance of one embodiment of the present invention.

FIG. 4B illustrates the cache-read operations in which texture data are read from the texture cache according to one embodiment of the present invention. As illustrated in FIG. 4B, at step 410, a texel address is received by the texture cache. As discussed above, a texel address may comprise a multi-dimensional index, and each dimension of the index may include a plurality of bits. Further, according to the present invention, low order bits (e.g. least significant 4 bits) may be used to address individual texels within a texel tile, and high order bits may be used to address individual texel tiles.

At step 420, higher order bits of the texel address are hashed according to a predetermined mapping function to generate a cache address. The predetermined mapping function applied may be one of the plurality of mapping functions discussed above. Furthermore, it should be apparent to those ordinarily skilled in the art, upon reading the present disclosure, that other mapping functions may be applied to hash the texel address into the cache address. However, it should also be noted that the mapping function employed should be the same as the one applied in step 320 of FIG. 4A.

At step 430, a tag is composed from the texel address. According to one embodiment of the present invention, a tag may include higher order bits of the texel address. It should be apparent to those of ordinary skill in the art that the tag may include any number of bits of the texel address as long as the tag can uniquely identify the contents of the texture cache. Further, it is preferable to use the same method of composing a tag from the texel address as in step 340 of FIG. 4A.

At step 440, the tag composed at step 430 is compared with the tag in the tag memory corresponding to the cache address. As discussed above, the tags stored in the tag memory uniquely identify the contents of the texture cache entries corresponding to the tag memory.

Thus, at step 450, if it is determined that the tag does not match the tag contained in the tag memory, the texture cache does not contain the desired texture data. Therefore, texture data contained in the texture memory is accessed. In one embodiment of the present invention, cache-write operations, such as steps 310 through 350, may be applied such that newly-read data may "blow out" any texture data previously stored at the cache address.

At step 460, if it is determined that the tag matches the tag contained in the tag memory corresponding to the cache entry, there is a cache-hit, and texture data contained in the texture cache at the cache address is retrieved.

A novel and unique method of mapping texture memory to a texture cache has thus been disclosed. Using the present invention, portions of the texture map, particularly those having a high aspect ratio, may be cached with minimal cache contention. The present invention has the advantage of simplicity as only a small number of gates implementing the mapping functions need to be implemented. In this way, manufacturing costs for the texture cache are saved. More importantly, the lower number of gates reduces the requirement of a large amount of valuable die area. Additionally, the present invention requires fewer memory elements to be implemented in the texture cache than in prior art approaches. It should be appreciated that the present invention has been described with specific relevance to texture maps having $2^{n-k} \times 2^{n-k}$ tiles of $2^k \times 2^k$ texels. However, such specific reference should not be construed to limit the scope of the present invention. Rather, the scope of the present invention should be construed according to the below claims.

What is claimed is:

1. In a computer system, a method of caching data stored in a first region of memory, the method comprising the steps of:
   a) mapping said first region of memory to a second region of memory according to a predetermined address-hashing scheme, wherein said first region of memory is addressed in a tiled format by a multi-dimensional index and said second region of memory is addressed by a cache address, and wherein said step (a) includes the steps of:
      a1) selectively hashing higher order bits of said multi-dimensional index to generate said cache address, said higher order bits comprising higher order bits from a first dimension of said multi-dimensional index and higher order bits from a second dimension of said multi-dimensional index, wherein one dimension of said multi-dimensional index is held constant while another dimension of said multi-dimensional index is varied throughout its entire range; and
      a2) using lower order bits of said multi-dimensional index to address individual texels within a texel tile in said second region of memory; and
   b) storing said data within said second region of memory.

2. The method according to claim 1 wherein said step (a1) includes the step of selectively performing logical operations on said higher order bits of said multi-dimensional index to generate said cache address, wherein said logical operations include an exclusive-OR operation.

3. The method according to claim 1 wherein said multi-dimensional index comprises a two-dimensional index (S, T).

4. The method according to claim 1 wherein said first region of memory comprises a texture memory for storing texture data.

5. The method according to claim 1 wherein said second region of memory comprises a texture cache.

6. The method according to claim 1 further comprising the steps of:
   c) composing a tag from said multi-dimensional index; and
   d) storing said tag in a tag memory in association with said cache address such that contents of said second region of memory at said cache address are identified by said tag.

7. In a computer system, a method of caching data stored in a first region of memory, the method comprising the steps of:

a) specifying a first address of said first region of memory to be accessed, wherein said first region of memory is configured for storing data in a tiled format, and wherein said first address comprises a multi-dimensional index;

b) mapping said first address to a second address of a second region of memory according to a predetermined address-hashing scheme, wherein said step (b) further comprises the steps of:

b1) performing logical operations on higher order bits of said first address to generate said second address, said higher order bits comprising higher order bits from a first dimension of said multi-dimensional index and higher order bits from a second dimension of said multi-dimensional index, wherein one dimension of said multi-dimensional index is held constant while another dimension of said multi dimensional index is varied throughout its entire range; and b2) using lower order bits of said multi-dimensional index to address individual texels within a texel tile in said second region of memory; and c) accessing said second address of said second region of memory.

8. The method according to claim 7 wherein said logical operations include an exclusive-OR operation.

9. The method according to claim 7 wherein said step (c) further comprises the steps of:

writing data to said second address of said second region of memory;

composing a tag from said first address; and storing said tag in association with said second address for identifying contents of said second region of memory at said second address.

10. The method according to claim 7 wherein said step (c) further comprises the steps of:

composing a new tag from said first address;

comparing said new tag to an old tag associated with said second address; and provided that said new tag is equivalent to said old tag, reading data stored at said second address.

11. The method according to claim 10 further comprising the steps of:

provided that said new tag is unequivalent to said old tag, reading data stored at said first address of said first region of memory.

12. The method according to claim 7 wherein said first region of memory comprises a texture memory.

13. The method according to claim 7 wherein said second region of memory comprises a texture cache.

14. A system for caching a memory region of a computer, the system comprising:

an address generating unit for providing a first address of said memory region, wherein said first address comprises a multi-dimensional index for addressing said memory region in a tiled format;

address mapping logic coupled to said address generating unit to receive said first address, said address mapping logic implementing a predetermined address-hashing scheme, said address-hashing scheme operating on higher order bits of said first address, said higher order bits comprising higher order bits from a first dimension of said multi-dimensional index and higher order bits from a second dimension of said multi-dimensional index, wherein one dimension of said multi-dimensional index is held constant while another dimension of said multi-dimensional index is varied throughout its entire range; and a cache memory coupled to said address mapping logic to receive a second address, wherein said second address is provided by said address mapping logic according to said first address and said predetermined address-hashing scheme, wherein lower order bits of said multi-dimensional index are used to address individual texels within a texel tile in said cache memory.

15. The system according to claim 14 wherein said address mapping logic comprises an XOR gate for performing an exclusive-OR operation on said higher order bits of said first address.

16. The system according to claim 14 wherein said first memory region is a texture memory.

17. The system according to claim 14 wherein said cache memory comprises a texture cache in which texture data are stored in a tiled format.

* * * * *